United States Patent [19]

Höptner

[11] 4,271,592
[45] Jun. 9, 1981

[54] HAND TOOL WITH A BLADE ADAPTED TO BE FOLDED INTO THE HANDLE

[76] Inventor: Hans-Gerd Höptner, Güldenwerth 62, 5630 Remscheid, Fed. Rep. of Germany

[21] Appl. No.: 118,724

[22] Filed: Feb. 5, 1980

[30] Foreign Application Priority Data

Feb. 5, 1979 [DE] Fed. Rep. of Germany ....... 2904279

[51] Int. Cl.³ .................................................. B26B 5/00
[52] U.S. Cl. .......................................... 30/153; 30/157
[58] Field of Search .................. 30/152, 153, 154, 158, 30/156, 157; 7/165

[56] References Cited

U.S. PATENT DOCUMENTS

| | | | |
|---|---|---|---|
| 306,651 | 10/1884 | Smith | 30/157 |
| 499,047 | 6/1893 | Slater | 30/153 |
| 1,486,725 | 3/1924 | Brown | 30/154 |
| 2,276,026 | 3/1942 | Davidson | 30/153 |
| 3,600,729 | 8/1971 | Laughlin | 30/152 |
| 4,073,057 | 2/1978 | Gilbert | 30/153 |

Primary Examiner—Jimmy C. Peters
Attorney, Agent, or Firm—Craig and Antonelli

[57] ABSTRACT

A hand tool with a knife, saw, screwdriver blade or the like in which a handle is formed of two U-shaped members of equal length that are pivotally articulated on a blade-retaining piece at free ends of their respective arms about pivot shafts that are perpendicular to each other. The U-shaped members are swingable in succession over a blade as a protective housing that encloses it. The blade is removably fixed by a screw in a receiving slot of the blade retaining piece. The two shafts are mutually offset or staggered in a longitudinal direction of the blade approximately by a thickness of a base portion of the U-shaped member.

14 Claims, 6 Drawing Figures

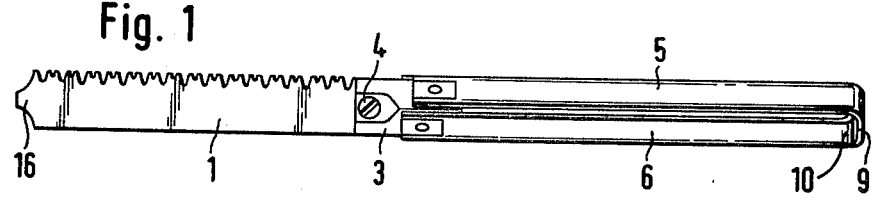
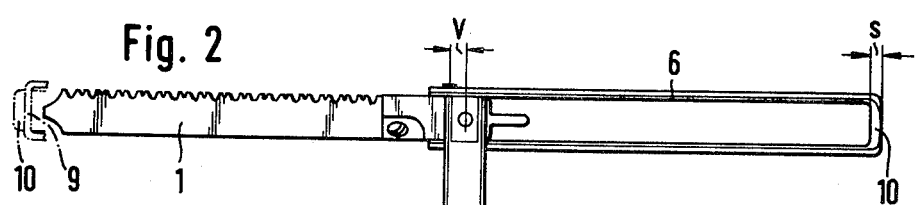
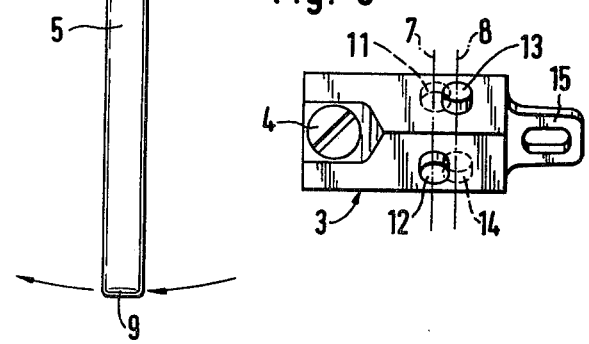
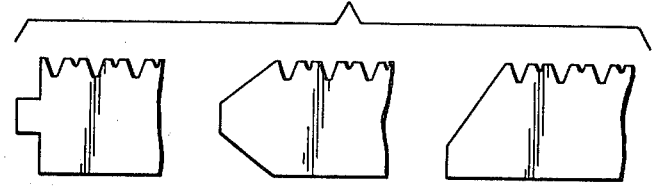
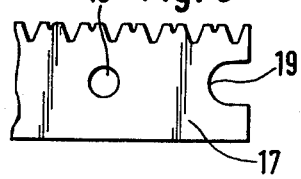
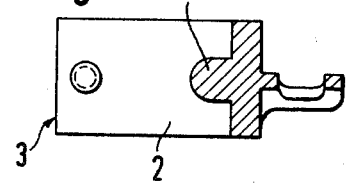

HAND TOOL WITH A BLADE ADAPTED TO BE FOLDED INTO THE HANDLE

The present invention relates to a hand tool, and, more particularly, to a hand tool provided with a knife blade, saw blade, or the like, wherein a handle of the hand tool includes two U-shaped members, of equal length, with respective arms of the U-shaped members being articulated at free ends about two shafts disposed perpendicular to each other and swingable on a blade retaining piece and pivotable in succession over the blade as a protective housing whereby the blade can be removably fixed by means of a fastener in a receiving slot of the blade retaining piece.

A hand tool of the aforementioned type is proposed in Offenlungsschrift No. 27 22 446; however, in the proposed construction a considerable gap exists between the base portions of the two U-shaped pieces in both an extended operational position of the hand tool and in the folded-up closed position of the tool. Aside from the fact that the presence of such gap detracts somewhat from the over-all appearance of the tool, a serious disadvantage resides in the fact that the presence of such gap raises the possibility of risk of injury to or a pinching of the fingers of the user. A further disadvantage resides in the fact that the overall length of the hand tool is unnecessarily increased due to the presence of the gap because the space of the gap is not exploited for storing the blade.

The aim underlying the present invention essentially resides in providing a hand tool having an articulated handle formed of two U-shaped members with a gap between the base portions of the U-shaped members forming the handle being kept to a minimum.

In accordance with advantageous features of the present invention, the two shafts arranged in the blade retaining or connecting piece are mutually offset or staggered in the longitudinal direction of the blade by approximately a thickness of the base portion of the U-shaped members forming the handle. By virtue of the offsetting of the two shafts, in one end setting of one of the U-shaped members and in the other end setting of the other U-shaped member, there is always the narrowest clearance around the base portion of the other U-shaped member and only so much play remains between the two base portions of the U-shaped members as is necessary to enable the relative swinging. Consequently, with a construction such as proposed by the present invention, a handle results that acts essentially as a closed body defining an internal cavity which is maximally used for storage of the longest possible blades.

If, as in the tool proposed in the aforementioned German Offenlungsschrift, the thickness of the base portion amounts to only about 1 mm, it would no longer be possible to use the rivets that pass through the blade retaining piece and are mutually oriented perpendicular to one another because they would interfer. Consequently, in accordance with further features of the present invention, the blade retaining piece is extruded or pressure cast and provided with shaped-on outer rivet pins for articulation of the U-shaped members forming the handle.

In accordance with a further development of the present invention, it may be provided that the thickness of the base portion amount to as much as 10 mm so that a center of mass of the U-shaped member is relatively distant from the point of articulation with the connecting piece. In such a construction, the blade retaining piece may be provided either with a shaped-on rivet pin or with holes for receiving rivet pins that can be inserted. The shifting of the center of mass in accordance with the proposal of the present invention facilitates the handling of the tool especially when folding or opening it because the U-shaped member can be managed with one hand if the friction at the points of articulation is not set tightly.

By virtue of the improved relationship between the handle length and the length of the interior cavity due to the constructional features of the present invention, the handle offers a possibility, without enlarging the total length of the tool, of having means for exchanging of blades on the tool. Therefore, the present invention proposed that the blade be furnished at its forward end with a projection in the longitudinal direction of the blade with the projection being fashioned as a screwdriver adapted to the dimensions of the fastening screw for the blade.

In accordance with the present invention, the forward end of the blade may be narrowed down by limiting edges unilaterally or bilaterally with the edges being slanted, curved or step-shaped to form an edge that is perpendicular to the longitudinal direction of the blade, its length being half that of the length of the slit of the screw up to the whole length of the slit.

In accordance with additional advantageous features of the present invention, the blade, at its fastening end, may be provided with a forked configuration, and with the base of the fork it can be set on a crosspiece that is positively adapted to the fork base passing through a slot in the blade-retaining piece.

The advantages of the last-noted features of the present invention reside in the fact that an exchange of blades can be made without recourse to a special tool because the new blade to be inserted can function as a screwdriver for disassembly of the old blade and the old blade can be utilized as a screwdriver for tightening the new blade. Moreover, because of the forked configuration of the fastening end of the blade and the positive adaptation of the fork base to the crosspiece in the slot of the blade retaining piece, in conjunction with a second stop point offered by the fastening screw, an entirely secure seat for the blade holder is ensured.

Accordingly, it is an object of the present invention to provide a hand tool having a foldable handle which avoids, by simple means, shortcomings and disadvantages encountered in the prior art.

Another object of the present invention resides in providing a hand tool having a foldable handle which provides a minimum gap or spacing between two base portions of the members forming the handle.

A further object of the present invention resides in providing a hand tool with a foldable handle which provides a maximum storage internally of the handle for long blades or tools.

Yet another object of the present invention resides in providing a hand tool with a foldable handle which enables a rapid assembly and disassembly of the tool from the handle so as to facilitate exchanging of an old tool by a new tool.

These and other objects, features, and advantages of the present invention will become more apparent from the following description when taken in connection with the accompanying drawings which show, for the purposes of illustration only, several embodiments in accordance with the present invention, and wherein:

FIG. 1 is a partially schematic side view of a hand tool in accordance with the present invention in an extended or opened position for use;

FIG. 2 is a lateral view of the hand tool of FIG. 1 rotated by 45° about its longitudinal axis, in an intermediate position in which the folding of the tool has begun;

FIG. 3 is a detailed side view, on an enlarged scale, of the blade retaining piece of the hand tool of the present invention;

FIG. 4 shows partial views of alternate forward ends of a blade;

FIG. 5 is a detail view, on an enlarged scale, of a rear end of a saw blade; and FIG. 6 is a longitudinal cross sectional view through the blade retaining piece of the hand tool of the present invention.

Referring now to the drawings wherein like reference numerals are used throughout the various views to designate like parts and, more particularly, to FIGS. 1 and 2, according to these Figures, a hand tool is provided wherein a rear end of a saw blade 1 is inserted into a receiving slot 2 (FIG. 6) of a blade retaining piece 3. The saw blade 1 is secured to the blade retaining piece 3 by suitable fasteners such as, for example, screws 4. A handle for the saw blade 1 includes a pair of U-shaped pieces 5, 6 with free ends of the arms of the respective U-shaped pieces 5, 6, that are of equal length, being pivotably mounted to the retaining piece 3 by shafts or pins 7, 8 which, as shown in FIG. 3, are disposed perpendicular to each other in the connecting piece 3. The inner width of the U-shaped pieces, that is, the width of the arms of the U-shaped pieces 5, 6 is somewhat less than a distance between the arms so that they can be swung over or inside one another. The two pivot shafts or pins 7, 8 which pivotally connect the U-shaped pieces 5, 6 to the connecting piece 3 are mutually staggered or offset in the longitudinal direction of the saw blade 1 by a distance V (FIG. 2). The distance V is equal to or slightly greater than a thickness S (FIG. 2) of the base portions 9, 10 of the respective U-shaped pieces 5, 6.

By virtue of the staggering or offsetting of the two pivot pins of shafts 7, 8 relative to each other in the position of use shown in FIG. 1, the base 9 of the U-shaped piece 5 has a narrow clearance at the outside adjacent to the base 10 of the U-shaped piece 6. After a folding, shown in phantom lines in FIG. 2, the base 9 of the U-shaped piece 5 is inside while the base 10 of the U-shaped piece 6 is disposed outwardly of the base 9. In the folded position the clearance between the two bases 9, 10 is also miminal.

As shown in FIG. 3, the pivot shafts 7, 8 may be composed or formed by rivet pins 11, 12, 13, 14 which extend outwardly and downwardly. The blade retaining piece 3 together with the rivet pins 11–14 is made as one literally pressure cast or extruded piece. Moreover, a suspending eye 15 is formed on a back of the blade retaining piece 3.

As shown in FIG. 1, the forward end of the blade 1 may be provided with a projection 16 that can be utilized as a screwdriver for fastening the screw 4. The wide edges of the projection 16 have a concave curvature. Alternatively, as shown in FIG. 4, the blades may be provided with various projecting end portions.

The rear or fastening end 17 of the saw blade 1, as shown in FIG. 5, is provided with a hole 18 for accommodating the fastening screw 4 and a fork-shaped end. The saw blade 1 is set with its fork base 19 on a crosspiece 20 (FIG. 6) which has a configuration corresponding to the fork base 19 so as to provide for a positive engagement between the saw blade 1 and the connecting piece 3 when the saw blade 1 passes through the slot 2 in the retaining piece 3. The fork receiving slot in the retaining piece 3 is made as a long hole with parallel side walls that are applied with little clearance on the parallel side walls of the crosspiece 20. By virtue of this guiding, the distance between the hole 18 at the rear end 17 of the saw blade 1 and the base for the slot 2 for the seat of the saw blade 1 becomes essentially immaterial so that no critical manufacturing tolerances need be observed.

While I have shown and described several embodiments in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. A hand tool comprising a tool portion, a handle portion and a tool retaining means for connecting the tool portion to the handle portion, the handle portion includes two U-shaped members of equal length, each of the U-shaped members includes a base portion and two arms interconnected by the base portion, a first pivot means for pivotally connecting free ends of the two arms of one of the U-shaped members to the retaining means, second pivot means having a pivot axis perpendicular to the pivot axis of the first pivot means for pivotally connecting the two arms of the other of the U-shaped member to the retaining means, the U-shaped members being pivotable about said pivot means so as to enable the members to form a protective housing enclosing the tool portion, characterized in that the first pivot means and second pivot means are offset with respect to each other in a longitudinal direction of the hand tool by a distance approximately corresponding to a thickness of a base portion of one of the U-shaped members.

2. A hand tool according to claim 1, characterized in that the retaining means includes a receiving slot for accommodating an end of the tool portion, and in that means are provided for releasably securing the tool portion in the retaining means.

3. A hand tool according to claim 2, characterized in that the retaining means is formed as a cast extruded member, and in that the first and second pivot means are shaped as rivet pins on the extruded member.

4. A hand tool according to claim 3, characterized in that the base portion of the U-shaped member has a thickness of up to approximately 10 mm.

5. A hand tool according to claim 4, characterized in that the tool portion is formed as a saw blade and includes a forward end, and a longitudinally extending projection is provided at the forward end of the saw blade, the releasable securing means includes a fastening screw, and in that the dimensions of the projection are adapted to dimensions of a slot of a head of the fastening screw.

6. A hand tool according to claim 4, characterized in that the tool portion is formed as a saw blade and includes a forward end, and in that the forward end of the blade is narrowed down by a unilateral limiting edge so as to define a forward edge perpendicular to a longitudinal axis of the saw blade, the releasable securing means include a fastening screw, and in that the forward edge has a length of between one-half to a whole length of a slot of a head of the fastening screw.

7. A hand tool according to claim 4, characterized in that the tool portion is formed as a saw blade and includes a forward end, and in that the forward end of the blade is narrowed down by a pair of bilateral limiting edges so as to define a projection at the forward end of the saw blade with the projection having a forward edge perpendicular to a longitudinal direction of the saw blade. The forward edge has a length of between one-half to a whole length of a slot of a head of the fastening screw.

8. A hand tool according to claim 7, characterized in that the bilateral limiting edges are curved.

9. A hand tool according to claim 7, characterized in that the bilateral limiting edges are slanted.

10. A hand tool according to claim 4, characterized in that the tool portion is formed as a saw blade and includes a forward end, stepped limiting edge means are provided for narrowing the forward edge of the saw blade so as to define a forward edge which is perpendicular to a longitudinal axis of the saw blade, and in that a forward edge has a length of between one-half to a whole length of a slot of a head of a fastening screw.

11. A hand tool according to one of claims 6, 7, 8, or 9, characterized in that the saw blade includes a fastening end adapted to be inserted in the receiving slot of the retaining means, the fastening end has a forked configuration, the retaining means includes a crosspiece means adapted to positively engage in the fork configuration of the fastening end when the fastening end is inserted into the receiving slot.

12. A hand tool according to claim 1, characterized in that the tool portion is one of a knife, a saw blade, and a screwdriver blade.

13. A hand tool according to claim 1, characterized in that the retaining means is formed as a cast extruded member, and in that the first and second pivot means are shaped as rivet pins on the extruded member.

14. A hand tool according to one of claims 1 or 13, characterized in that the base portion of the U-shaped member has a thickness of up to approximately 10 mm.

* * * * *